United States Patent [19]

Yoshida et al.

[11] 4,449,281
[45] May 22, 1984

[54] METHOD OF PRODUCING MULTIPLE-WALL, COMPOSITE TUBULAR STRUCTURES

[75] Inventors: Toshio Yoshida, Kobe; Shigetomo Matsui, Higashiosaka; Toshio Atsuta, Akashi, all of Japan

[73] Assignee: Kawasaki Jukogyo Kabushiki Kaisha, Hyogo, Japan

[21] Appl. No.: 358,800

[22] Filed: Mar. 16, 1982

[51] Int. Cl.³ ............................................. B23P 17/00
[52] U.S. Cl. .................................. 29/421 R; 29/447;
138/140; 219/10.43
[58] Field of Search ............................ 29/447, 421 R;
219/10.41, 10.43; 138/140

[56] References Cited

U.S. PATENT DOCUMENTS

| | | | |
|---|---|---|---|
| 2,986,847 | 6/1961 | Sato | 29/447 X |
| 3,064,344 | 11/1962 | Arne | 29/447 X |
| 3,461,523 | 8/1969 | Peehs et al. | 29/447 X |
| 3,532,476 | 10/1970 | Peehs et al. | 29/447 X |
| 4,332,073 | 6/1982 | Yoshida et al. | 29/421 R |
| 4,377,894 | 3/1983 | Yoshida et al. | 29/447 X |

*Primary Examiner*—Charlie T. Moon
*Attorney, Agent, or Firm*—Wenderoth, Lind & Ponack

[57] ABSTRACT

A double-wall composite pipe is produced by inserting an inner pipe in an outer pipe, filling the inner pipe with cold water under pressure to cause the inner pipe to expand plastically into tight contact with the outer pipe, applying heat to the outer part of the outer pipe by high-frequency induction heating, thereby to establish a locally heated zone thereof around the circumference thereof and causing the heated zone to travel from one end to the other end of the outer pipe thereby to cause it to successively expand locally in diameter in the travelling heated zone. The pressure in the inner pipe then is removed, the pipes thereafter being permitted to attain the ambient temperature, thereby to obtain an interference fit therebetween.

5 Claims, 3 Drawing Figures

METHOD OF PRODUCING MULTIPLE-WALL, COMPOSITE TUBULAR STRUCTURES

BACKGROUND OF THE INVENTION

This invention relates generally to the production of composite metal tubes having laminated multiple walls and used for piping in chemical and other plants, as oil and gas well tubing, for oil and gas pipelines, and like pipes.

Among the multiple-wall composite tubes of the character referred to above and known heretofore for transporting fluids such as those containing corrosive substances, there are double-wall pipes in each of which the inner pipe or liner tube is made of a corrosion-resistant material for effective conducting of corrosive fluid, while the outer pipe is designed to provide strength to withstand internal pressures and external forces. For example, there is a double-wall pipe comprising a stainless-steel inner pipe and a carbon-steel outer pipe in which the inner pipe is fitted.

Among the known methods of producing such composite pipes, the shrink-fit method and other tube heating and expanding methods have been developed. In a known method disclosed in U.S. Pat. No. 3,064,344 to Arne, the inner pipe is inserted into the outer pipe and expanded into contact with the inner surface of the outer pipe, and then the outer pipe is heated, the outer pipe thereafter being cooled and shrunk thereby to obtain a tight or interference fit between the two pipes.

In this method, when the inner pipe is expanded into contact with the inner surface of the outer pipe, the two pipes are brought into tight heat transferring relationship so that even if the outer pipe is heated thereafter for thermal expansion thereof, a substantial temperature difference cannot be established between the outer and inner pipes. This means that the method is difficult to put into practice. Therefore, in order to enable establishment of a substantial temperature difference between the pipes, it is necessary to provide a clearance between the pipes before the heating of the outer pipe is carried out.

Furthermore, according to this method, a considerably large-scale heating device comprising a large number of heating elements or the like must be provided on the outer side of the outer tube, whereby the required equipment becomes disadvantageously large and expensive. Another difficulty arises in the case of tubes of long length in that the weight of the apparatus and equipment becomes great, whereby the operation and maintenance thereof become troublesome.

SUMMARY OF THE INVENTION

It is an object of this invention to provide a method of producing multiple-wall, composite tubular structures in which method the above described difficulties encountered in the practice of known methods are overcome.

According to this invention, briefly summarized, there is provided a method of producing multiple-wall composite tubes which comprises: inserting an inner tube into an outer tube; applying pressure to the interior of the inner tube thereby to cause the inner tube to expand plastically into tight contact with the outer tube; with the inner and outer tubes in this state, applying heat from the outside only to the outer tube by high-frequency induction heating thereby to create a temperature difference between the outer and inner tubes and to cause the outer tube to expand in diameter; and then removing the pressure in the inner tube, the tubes thereafter being permitted to attain the ambient temperature thereby to obtain a fit of high degree of tightness or interference therebetween.

The nature, utility, and further features of this invention will be more clearly apparent from the following detailed description with respect to preferred embodiments of the invention when read in conjunction with the accompanying drawings, briefly described below.

DETAILED DESCRIPTION OF THE INVENTION

Figure 1:
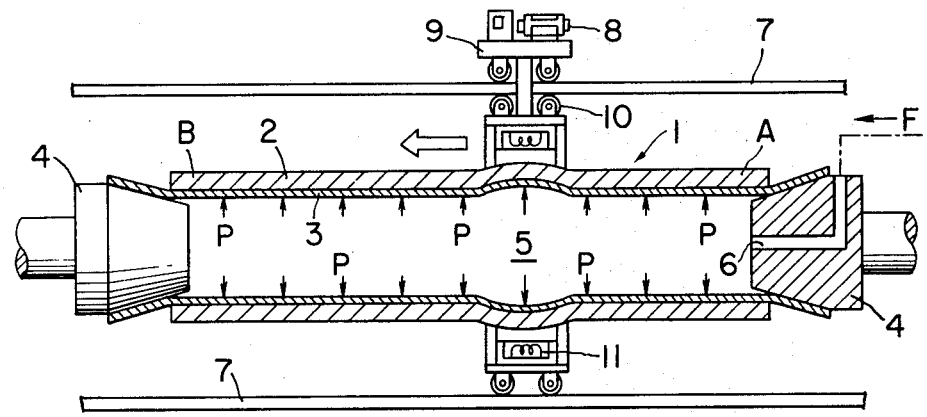
FIG. 1 is a side view, in longitudinal section, showing the essential parts of one example of apparatus for practicing the method of the invention.

In an embodiment of this invention which will be described with reference to FIG. 1, the method of this invention is applied to a unit double-wall tube 1 to be used as an oil-well pipe. This double-wall tube 1 comprises an outer tube 2 of a carbon steel, for example, and an inner tube 3 of a corrosion-resistant material, such as a stainless steel, placed by a suitable procedure in the outer tube 2. The tube 1 is suitably supported in fixed state by means not shown. The opposite ends of this double-wall tube 1 are tightly closed by closing plugs 4 respectively coupled to hydraulic-pressure jacks (not shown) for applying closing force to the plugs. One of these plugs is provided with a liquid passage 6 through which a liquid for tube expanding such as, for example, cold water 5 at a temperature of approximately zero degrees Centigrade is fed by a positive-displacement pumping means (e.g., a plunger pump, not shown) to fill the interior of the inner tube 3.

Then, after the interior of the inner tube 3 has become full of water, pressure F is applied to this water by means of the plunger pump thereby to impart a tube-expanding pressure P to the entire inner wall surface of the inner tube 3. Thereafter, the applied liquid pressure is maintained at a value of an order to impart plastic deformation to the inner tube 3. The inner tube 3 is therefore pressed into tight contact with the inner surface of the outer tube 2.

With the double-wall tube 1 in this state, the outer tube 2 is heated locally in an annular heated zone thereof around its cylindrical wall to a specific temperature, the annular heated zone being caused to travel at constant speed from one end A to the other end B of the outer tube 2. This mode of heating of the outer tube 2 is accomplished by a suitable high-frequency induction heating device 11 annularly encircling the outer tube 2 and riding on rollers 10 rolling along a plurality of rails 7 supported on the outer side of the double-wall tube 1 and extending parallelly to the axis thereof. The heating device 11 is driven along the rails 7 from the end A to the end B by a locomotive truck or carriage 9 driven by a driving motor 8 thereby to cause the annular heated zone to travel as described above.

Figure 2:
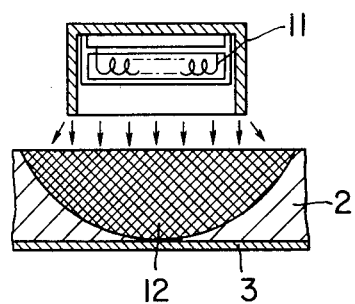
FIG. 2 is a relatively enlarged, fragmentary side view indicating a state of heating to establish a heated zone.

The outer tube 2 is thus heated in the annular heated zone by the heating device 11 to a depth which is made as near the inner side of the outer tube 2 without any appreciable heat transmission to the inner tube 3 as indicated in FIG. 2, in which the heated zone is represented in a simplified manner in longitudinal section as the area 12 of raised temperature of the order of 300° C., for example. Depending on the design, the outer tube 2 may be heated on only its outer portion.

It is to be noted that the use of a high-frequency induction heating device in this invention is advantageous in that the high-frequency induction heating can be controlled easily as to the depth of the portion of material to be heated thereby. This means that the heating device 11 can be so controlled as to apply heat only to the outer tube 2 and not to the inner tube 3. Therefore, establishment of substantial temperature difference between the outer and inner tubes can be made possible even in the state where the inner tube 3 is pressed against the inner surface of the outer tube 2 and there is no clearance between the two tubes.

Thus, as the high-frequency heating device 11 travels in the longitudinal direction of the double-wall tube 1, the heated portion 12 travels from the end A to the end B. As a consequence, in the traveling heated zone, the tube-expanding force due to the hydraulic pressure applied to the interior of the inner tube 3 causes the inner tube to expand plastically in diameter so as to conform to the thermally increased diameter of the outer tube 2. After the heated zone has passed by each portion of the tube 1, the inner and outer tubes in that portion shrink in diameter.

Figure 3:
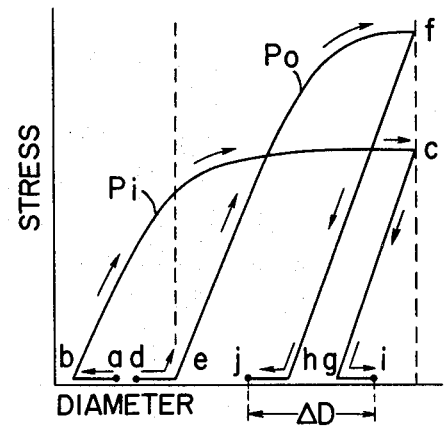
FIG. 3 is a graph indicating stress-strain relationships for a description of the changes occurring in inner and outer tubes in the method of the invention.

These changes in diameter can be described more clearly by means of the graphical representation of FIG. 3 indicating local stress-strain relationships. The stress-strain (hoop tension versus variation in diameter) relationship of the inner tube 3 is indicated by curve Pi. The inner tube 3 has an initial, natural outer diameter as at a but, when it is filled with the cold tube-expanding liquid 5, is cooled and contracts to the state indicated at b. Then, when the liquid pressure is increased, the tube expanding force F (hoop tension) acting on the inner tube 3 increases, whereby its diameter expands until it yields and can undergo plastic deformation.

On the other hand, the inner diameter of the outer tube 2 as indicated by curve Po increases slightly from diameter d to diameter e as a consequence of the effect of heat of the heated area 12 as the high-frequency heating device 11 travels over each portion of the outer tube 2 as indicated in FIG. 2. When the outer tube 2 assumes this state at e, the outer tube 2 expands and reaches a point f. At the same time, since the inner tube 3 is in a plastically deformable state, it follows the expansion of the outer tube 2 and reaches the state c. The heated region 12 of the outer tube 2 does not reach the inner tube 3 as stated hereinbefore.

When the above described state at each portion of the tube 1 comes to an end, that is, when the high-frequency heating device 11 has passed by that portion, the heated region 12 no longer exists, and a cooling state commences. As a consequence, the outer tube 2 is cooled and shrinks, the hoop stress begins to disappear, and inner tube 3 also shrinks in a similar manner.

Then, when the high-frequency heating device 11 reaches the terminal end B, the plugs 4 are removed to discharge the tube-expanding water 5 and release the tube-expanding pressure, whereby both the inner tube 3 and the outer tube 2 are no longer subjected to tube-expanding force and thereby respectively shrink to unstressed states at g and h as indicated in FIG. 3. At the same time, the temperature of the inner tube 3 rises from the previous cooled value to the natural ambient temperature, whereby the diameter of the inner tube tends to increase from g to i, while the outer tube 2 is cooled and tends to shrink from h to j. As a result, a tight or interference fit corresponding to $\Delta D$ is obtained between the two tubes.

In the above described process, since the heated region 12 does not reach the inner tube 3, the temperature of the tube-expanding water 5 does not rise, whereby the water retains its cooling effect.

The modes of practicing this invention are not limited, of course, to those of the above described embodiment of the invention, various other modes being possible.

In one example of specific experimental practice of this invention, an inner tube of stainless steel (AISI 316L) of 1-mm wall thickness was inserted in a carbon-steel outer tube of an inner diameter of 90 mm and 9-mm wall thickness, and a hydraulic pressure of 800 Kg/mm$^2$ was applied to the interior of the inner tube.

The composite tube thus formed was heated, while the internal pressure was being applied to the inner tube, according to the method of this invention by a high-frequency induction heating device comprising essentially an induction coil adapted to encircle the outer tube and having a width of 120 mm in the longitudinal or axial direction of the tubes. Electric current at a frequency of 3 KHz was passed through this induction coil as it was caused to travel in the axial direction at a speed of 300 mm/minute, whereby each point or cross section of the outer tube was heated for a period of approximately 25 seconds.

As a result, it was found that the outer tube temperature was 350° C. (average) and that of the inner tube was 50° C. (average).

The heating devices embodying this invention are not limited, of course, to that of the above described embodiment of the invention, various other modes being possible. For example, a high-frequency induction heating device of a shape corresponding to a convolution of a helix can be used to heat the outer tube 2 along a helical heating path.

Furthermore, the method of producing composite tubes according to this invention is not limited to producing tubes for oil and gas well tubings but is also advantageously applicable to the production of pipes for fluid-conveying pipelines, pipes for piping in plants, and other pipes and tubular and cylindrical structures.

The annular heating device used in the method of this invention is advantageous in that it is basically applicable to composite tubes of any length because the heating device is of a locally-heating traveling type and is not required to cover the entire length of each composite tube. Another feature is that this heating device of locally-heating traveling type can be made relatively small and simple in construction. Accordingly, the space occupied by the entire apparatus can be reduced, and the initial cost can be lowered. Furthermore, the maintenance of the apparatus is facilitated and made safe.

Still another merit of the embodiment of this invention is that, since the heating device is adapted to travel in the axial direction of the composite tube, the quantity of heat imparted to the outer tube 2 can be regulated by adjusting the traveling speed of the heating device, which is advantageous for control purposes. By such control, heating can be carried out in a concentrated manner in a short time.

A further feature of this invention is that, since a relatively low temperature for heating is sufficient to create a temperature difference between the two pipes, the product precision can be made high without causing deterioration of the properties of the outer tube, and there is no heating of the pressure applying liquid, whereby a separately provided cooling liquid is not necessary.

While this invention has been described above with respect to one embodiment thereof in which two tubes are fitted together to form a dual or double-wall tube, it will be apparent that the principle of this invention can be advantageously applied to the production of other multiple-wall composite tubes formed from more than two tubes.

What is claimed is:

1. A method of producing multiple-wall composite tubes, said method comprising:

inserting an inner tube into an outer tube;

applying pressure to the interior of said inner tube and thereby causing said inner tube to expand plastically into tight contact with said outer tube;

with said inner and outer tubes in such state of tight contact, and while said pressure is maintained applying heat from the outside to said outer tube only without applying substantially any heat to said inner tube and thereby creating a temperature difference between said inner and outer tubes and causing said outer tube to expand in diameter, said applying heat comprising establishing, by high-frequency induction heating means, a locally heated zone of said outer tube substantially around the circumference thereof, and causing said heated zone to travel from one end to the other end of said outer tube, thereby causing said outer tube to successively expand locally in the traveling heated zone; and then removing said pressure from the interior of said inner tube, and permitting said tubes thereafter to obtain ambient temperature and obtain a fit of high degree of interference therebetween.

2. A method of producing multiple-wall composite tubes as claimed in claim 1, comprising arranging said high-frequency induction heating means in substantially annular arrangement around said outer tube, and moving said means parallelly to the longitudinal axis of said outer tube from said one end to said other end thereof.

3. A method of producing multiple-wall composite tubes as claimed in claim 1, wherein said pressure is applied to the interior of said inner tube by closing the opposite ends of said inner tube, filling the interior thereof with a liquid, and pressurizing said liquid.

4. A method of producing multiple-wall composite tubes as claimed in claim 3, further comprising maintaining said liquid in said inner tube at a low temperature and thereby increasing the temperature difference between said tubes.

5. A method of producing multiple-wall composite tubes as claimed in claim 1, comprising operating said high-frequency induction heating means to heat locally said outer tube along a helical path therearound with a helical pitch sufficient for full heating coverage of said outer tube.

* * * * *